(12) United States Patent
Stone

(10) Patent No.: US 6,870,986 B1
(45) Date of Patent: Mar. 22, 2005

(54) OPAQUE OPTICAL SWITCHING/ROUTING SYSTEMS

(75) Inventor: Thomas W. Stone, Hellertown, PA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/700,112

(22) Filed: Nov. 3, 2003

(51) Int. Cl.[7] .............................. G02B 6/26; G02B 6/00
(52) U.S. Cl. .......................... 385/17; 385/147; 398/45; 398/49; 398/130
(58) Field of Search ........................... 385/15–19, 147; 398/45–50, 130–135

(56) References Cited

U.S. PATENT DOCUMENTS

| | | | |
|---|---|---|---|
| 5,692,077 A | 11/1997 | Stone et al. | |
| 5,706,383 A | 1/1998 | Malcuit et al. | |
| 5,771,320 A | 6/1998 | Stone | |
| 2003/0180012 A1 * | 9/2003 | Deane et al. | 385/92 |
| 2004/0027816 A1 * | 2/2004 | Ice | 361/797 |

OTHER PUBLICATIONS

B. Wu, "Optical Switch Variations: How Will They Play?" Posted Jun. 1, 2001. Retrieved from http://www.x-changemag.com/articles/161solutions5.html on Nov. 3, 2003.

J.–F. Labourdette, "Opaque and Transparent Networking," Optical Networks Magazine, May/Jun. 2003, pp. 3–7, Available at http://www.tellium.com/optical/techpubs.html.

* cited by examiner

Primary Examiner—Akm Enayet Ullah

(57) ABSTRACT

An optical switching and/or routing system including a first opto-electronic assembly, a router assembly, a second opto-electronic assembly and redirecting means interposed between the router assembly and the second opto-electronic assembly. Each opto-electronic assembly includes at least one module, each module having a detector, an amplifier and a laser. During operation, the optical switching and routing system of this invention receives the input optical beams at the first opto-electronic assembly and emits a second group of optical beams from the first opto-electronic assembly. The second group of optical beams is received at the router assembly and each beam from the second group of optical beams is routed to a pre-selected location. From the pre-selected locations to which they have been routed, the second group of optical beams is redirected to the second opto-electronic assembly. The second opto-electronic assembly receives the second group of optical beams and emits the output beams.

25 Claims, 5 Drawing Sheets

OPAQUE OPTICAL SWITCHING/ROUTING SYSTEMS

STATEMENT REGARDING FEDERALLY SPONSORED RESEARCH OR DEVELOPMENT

This invention was made with U.S. Government support from the U.S. Air Force under Contract F 30602-98-C-0079. The U.S. Government has certain rights in the invention.

BACKGROUND OF THE INVENTION

This invention relates generally to interconnection and switching systems, and, more particularly to optical switching systems including switched-grating and opto-electronic layers.

There are many advantages of "transparent" (purely optical) optical switches. Using transparent switches optical carriers may be routed from input fiber to output fiber without the necessity of converting the signal to electronic form and reproducing the optical signal. This can also provide savings when bandwidths are upgraded, since there is no electronic layer to upgrade. However, there are hidden complexities in the transparent switch approach when used with WDM and DWDM carriers. For example, if two signals arriving on different fibers on the same wavelength channel are switched to the same output fiber, there is a wavelength conflict. To address such conflicts, "wavelength shifting" technologies are being developed. Many of these "wavelength shifting" technologies add a tremendous complexity to the overall switch.

The "opaque optical switch" model (all-electronic or optical-to-electronic-to-optical model) carries its complexity up front. Once this complexity is provided the switch operates in a simple and robust fashion. However, all-electronic optical crossconnects are encumbered by having to propagate high bandwidth electronic signals over relatively large distances as required in a crossconnect.

There is a need for an optical switch that provides the advantages of both the "transparent" and the "opaque" optical switches.

It is therefore an object of this invention to provide an optical switching/routing system that has the advantages of both the "transparent" and the "opaque" optical switches.

It is a further object of this invention to reduce the hidden complexities of "transparent" optical switches.

BRIEF SUMMARY OF THE INVENTION

The objects set forth above as well as further and other objects and advantages of the present invention are achieved by the embodiments of the invention described hereinbelow.

The optical switching and/or routing system of this invention includes a first opto-electronic assembly, a router assembly, a second opto-electronic assembly and redirecting means interposed between the router assembly and the second opto-electronic assembly. Each opto-electronic assembly includes at least one module, each module having a detector, an amplifier and a laser. The laser, in one embodiment, is a vertical cavity surface emitting laser.

During operation, the optical switching and routing system of this invention receives the input optical beams at the first opto-electronic assembly. A second group of optical beams is emitted from the first opto-electronic assembly. The second group of optical beams is received at the router assembly and each beam from the second group of optical beams is routed to a pre-selected location. From the pre-selected locations to which they have been routed, the second group of optical beams is redirected to the second opto-electronic assembly. The second opto-electronic assembly receives the second group of optical beams and emits the output beams.

In one embodiment of this invention, the modules of the first opto-electronic assembly receive input beams where the input optical beams include beams of at least two different center wavelengths. The modules of the first opto-electronic assembly emit beams of substantially a single center wavelength and polarization. The router assembly and the redirecting means operate at substantially a single center wavelength. Finally, during operation, in this embodiment, the modules of the second opto-electronic assembly receive the routed, redirected single center wavelength beams from redirecting means and emit beams that include beams of at least two different center wavelengths. Operating the router assembly and the redirecting means at substantially a single center wavelength reduces the hidden complexity of the switch.

For a better understanding of the present invention, together with other and further objects thereof, reference is made to the accompanying drawings and detailed description and its scope will be pointed out in the appended claims.

DETAILED DESCRIPTION OF THE INVENTION

The systems and methods of this invention provide the advantages of both the "transparent" all optical and the "opaque" optical-electronic-optical switches. It should be recognized that the terms "optical switching" system, "optical switching/routing" system and "optical switching and routing" system may be taken to be synonymous, all covering aspects of both switching and/or routing systems.

The systems and methods of this invention enable the use of very simple, inexpensive, and scalable optical crossconnects to accomplish the complex task of optical switching in an optical fiber environment. The systems of this invention have a clear advantage over all-electronic ("opaque") optical crossconnects because the latter are encumbered by having to propagate high bandwidth electronic signals over relatively large distances as required in a crossconnect. In the methods and systems of this invention, the long distance high bandwidth optical crossconnect function is performed optically, in the domain where it is most efficient. Similarly, the high bandwidth electronics are used in localized areas or "smart pixels" where the optical-to-electronic-to-optical is most efficient and inexpensive. The inherent optical-to-electronic-to-optical conversion at each side of the switch permits very simple optical switching technologies to be used for the optical crossconnect function.

Figure 1:
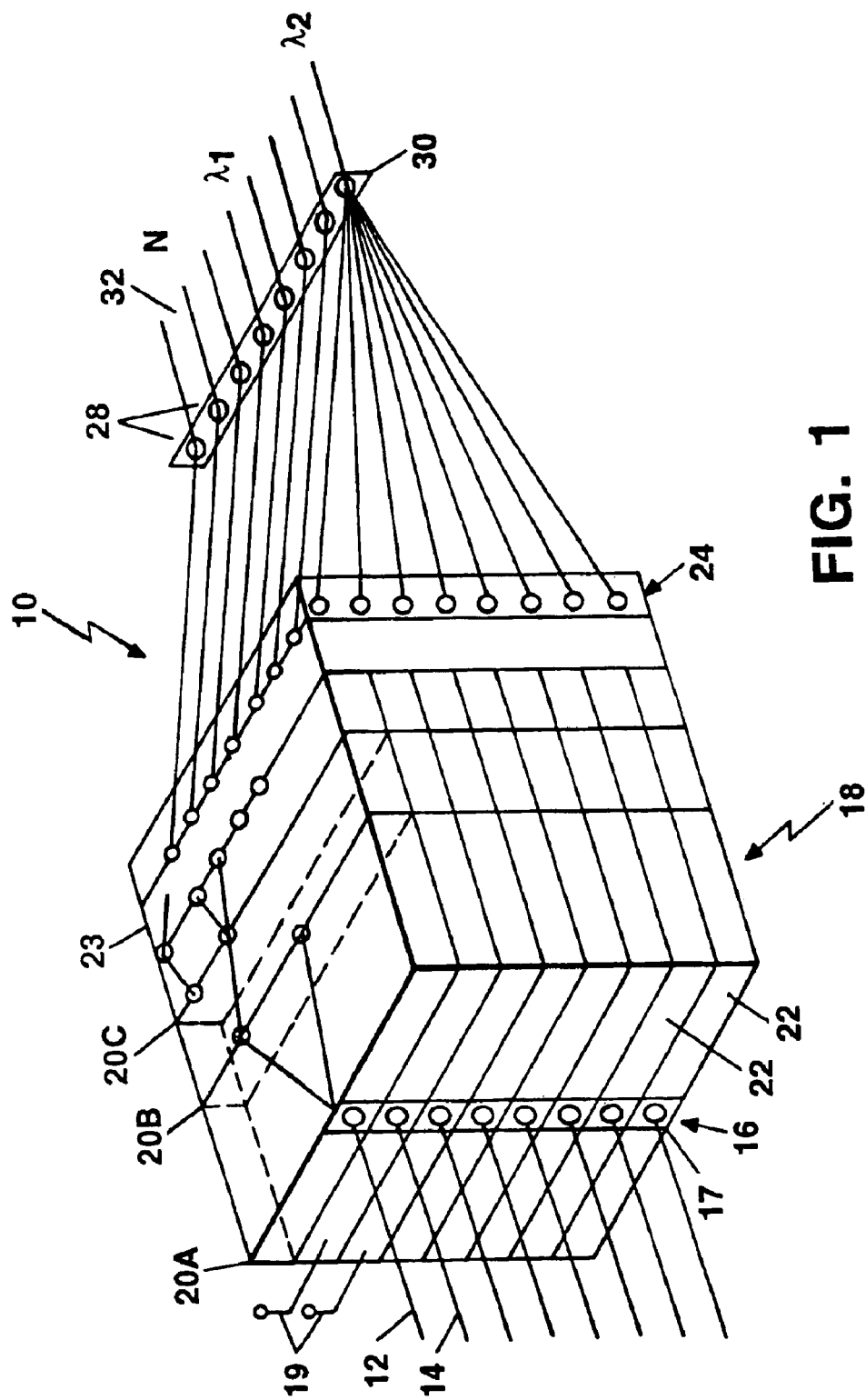
FIG. 1 is a pictorial, schematic representation of an optical switching/routing system of this invention.

Reference is now made to FIG. 1 of the drawings. The optical switching and routing system 10, an embodiment of this invention, shown therein is capable of receiving a series of optical input signals 12 and 14, for example, which form a vertical input array of m optical channels as input to first opto-electronic assembly 16. These optical input signals 12, 14 may have been produced by conventional demultiplexing means (not shown) or may be directly input to system 10, or they may have originated in various other manners including, but not limited to, free space and guided wave sources. The first opto-electronic assembly 16 includes m modules, each module 17 (shown, in more detail, in FIG. 2A) having a detector 110, an amplifier 120 and a laser 130. Each module is capable of receiving one beam 14 at the detector 110, converting the beam 14 to an electrical signal, amplifying the electrical signal if necessary (in some embodiments, amplification may not be required) and using the electrical signal to drive the laser 130. The laser 130, in one embodiment, can be a vertical cavity surface emitting laser (VCSEL). A micro-optical component 146 (a refractive or diffractive lens in one embodiment) may be used to collimate or focus the output of laser 130. Following the first opto-electronic assembly 16 is a router assembly 18. The m modules 17 of the first opto-electronic assembly 16 are capable of emitting a second series of optical signals which form a vertical array of m optical channels as input to the router assembly 18. In one embodiment, the router assembly is that described in U.S. Pat. No. 5,771,320, issued to Thomas W. Stone on Jun. 23, 1998, which is herein incorporated by reference, that includes a cascade of p switchable diffractive gratings 20A, 20B, 20C, etc., (also referred to as gratings 20) which are separated by distances varying by powers of 2 and which are each separately switchable in segments 22 for each of the m modules 17 in the first opto-electronic assembly 16. This independent switching of each of the gratings 20 for each input module can be accomplished by pixellating each of the gratings 20 into m stripe segments 22. These m grating segments 22 of each of gratings 20 are separately controlled with electrical signals 19. In one embodiment, when a particular grating segment 22 is "on," the beam incident on that segment is completely switched by diffraction with little loss from the incident beam to a diffracted beam traveling in a new direction. When the grating segment 22 is switched "off" the incident beam is transmitted with little loss and without deviation. These switched gratings therefore steer the incident beam along a selected path as a function of the control signals 19 which turn the various grating segments 22 "on" or "off." Several of such selectable paths for beam 12 are illustrated in the top layer of the router assembly 18. The p cascaded, pixellated switchable gratings are used to route each of the beams 32 from the opto-electronic assembly 16 to one of n columns in the output plane 23 (in one embodiment, n equals $2^p$). Router assembly 18 is followed by redirecting means 24. Redirecting means 24 are capable of directing and focusing each of the m possible beam locations in each column to a common module 28 in second opto-electronic assembly 30. Each module 28 (also shown, in more detail, in FIG. 2b) of the second opto-electronic assembly 30 includes a detector 110, an amplifier 120 and a laser 130. The redirecting means 24 are designed to be capable of directing and focusing each of the m possible beam locations in each column to the detector 110 in the corresponding module 28. The modules ("smart pixels") 28 of the second opto-electronic assembly 30 are capable of emitting a third series of optical signals 32 which form a horizontal array of optical channels as outputs. The output beams (channels) may be coupled into optical wave guides (such as fibers) or propagate as free space beams or a combination thereof.

The operation of the optical switching and routing system 10 can be described in reference to the four assemblies that comprise the system 10. For specificity, consider the switching of the first optical input signal 12 of the signals 12, 14 and that constitute the input to system 10. The first input signal 12 is incident on the first of the modules 17 of the first opto-electronic assembly 16. The signal 12 is incident on the detector 110 that is included in the module 17. The optical signal 12 is then converted to an electrical signal by the detector 110 of FIG. 2a and amplified by the amplifier 120 (see FIG. 2a). This electrical signal provides the input to modulate or drive the laser 130 and the optical output of laser 130 provides the input to router assembly 18. The optical signal from the first of modules 17 is to be routed to the ith one of the modules 28 of the second opto-electronic assembly 30. The output beam from laser 130 of the first module 17 of the first opto-electronic assembly 16 is incident on the upper horizontal segments 21 of switchable gratings 20A, 20B, and 20C. The states of the grating segments 22 are selected to steer the beam to the ith column in the output plane 23. Redirecting means 24 direct and focus the beam from laser 130 of the first module 17, that has been steered to the ith column of the output plane, to the detector 210 (FIG. 2b) in the ith module 28 in the optical-to-electrical assembly 30. The detector 210 produces an electrical signal from the optical beam. The electrical signal is an input to amplifier 220. The output of the amplifier 220 drives or modulates the laser 230. The optical beam output of laser 230 of the ith module constitutes the ith output beam 32.

In this embodiment of the router assembly, during operation, control signals 19 effect the "on-off" operation of the gratings 20 thereby directing the optical output (beams) of each module 17 of the first opto-electronic assembly 16 to the column that will be redirected to the desired module 28 of second opto-electronic assembly 30. The router assembly 18 contains p cascaded gratings 20, each of which are pixellated into m separately controllable segments 22. Thus there are p*m control signals 19 required to independently route each of the input signals from the first opto-electronic assembly 16 to its selected column in the central plane 22.

Figure 3:
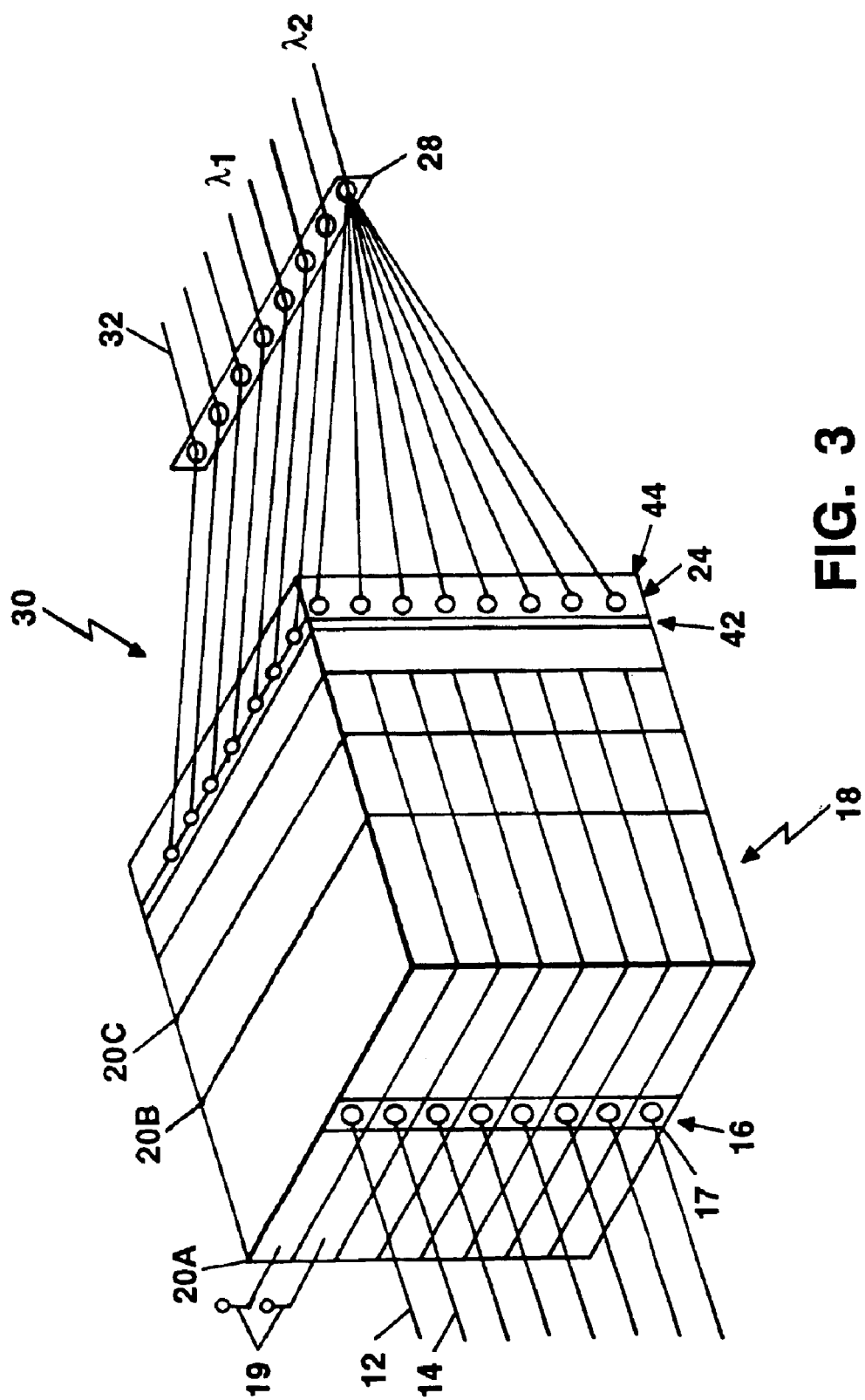
FIG. 3 is a pictorial, schematic representation of the optical switching/routing system of this invention including noise suppression means and optical redirection means.

In another embodiment of this invention, shown in FIG. 3, the optical switching and routing system 40 also includes a noise suppressor stage 42 located between the router assembly 18 and the redirecting means 24 and optically associated with the router assembly 18 and the redirecting means 24. In one embodiment, the noise suppressor stage utilizes the passive saturable absorber noise suppressor device described in U.S. Pat. No. 5,692,077 or the active noise suppressor device described in U.S. Pat. No. 5,706,383. Another embodiment of the noise suppressor stage is an additional pixellated switchable grating plane or alternative, a pixellated switchable grating based redirecting means 24, which can be set to deflect out of the system the crosstalk signals in the non selected channels.

Embodiments of the redirecting means include optical redirecting means and electrical redirecting means. Optical embodiments 44 (FIG. 3) of the redirecting means include, but are not limited to, arrays of microlenses and pixellated and fixed (not switchable) surface relief or volume holographic grating arrays, arrays of micromirrors, as shown in FIG. 3. In one embodiment, the redirecting means 24 may be switchable in order to provide additional noise/crosstalk suppression means.

It should be noted that in the two-stage optical switch shown in FIG. 1 of U.S. Pat. No. 5,771,320, the second stage is an embodiment of the redirecting means.

Figure 4:
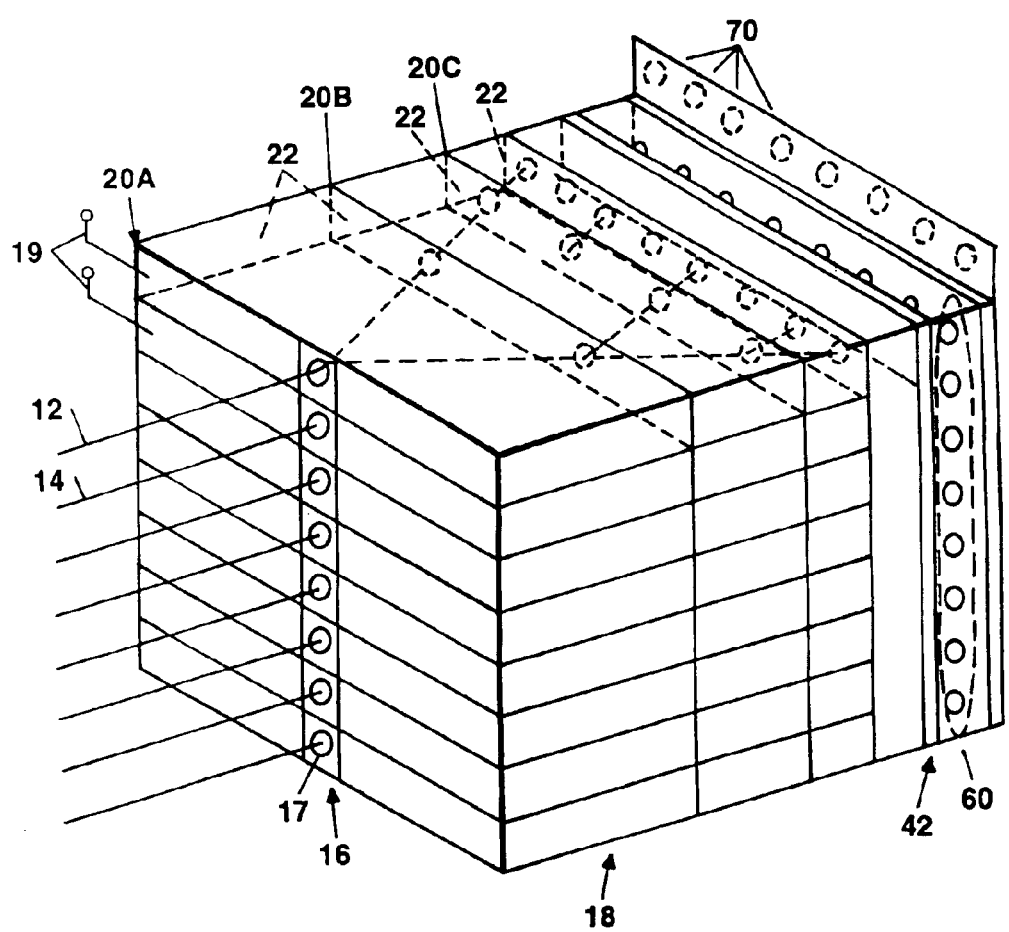
FIG. 4 is a pictorial, schematic representation of the optical switching/routing system of this invention including noise suppression means and electrical redirection means.

In yet another embodiment of this invention, shown in FIG. 4, the optical switching and routing system 40 includes electrical redirecting means 60. One electrical embodiment 60 of the redirecting means includes n stripe radiation detectors, one stripe detector for each of the n possible locations that each one of the incident beams can be directed to. Each stripe detector can receive the optical output (beam) that has been directed (steered) by the router assembly (gratings) 20 and can generate an electrical signal. The electrical signal, which may be amplified in one embodiment, is provided to a laser 70 (a VCSEL in one embodiment or a conventional edge emitting laser in another embodiment). The electrical signal determines (modulates or drives) the output of the laser 70.

Another electrical embodiment 60 of the redirecting means includes n arrays of m radiation detectors, one array of m detectors for each of the n possible columns that each one of the incident beams can be directed to. Each detector in each array can receive the optical output (beam) that has been directed (steered) by the router assembly (gratings) 20 and can generate an electrical signal. The electrical signals, which may be amplified, from the detectors in one of the n arrays are summed together and provided to a laser 70 (a VCSEL in one embodiment or a conventional edge emitting laser in another embodiment). The electrical signal determines (modulates or drives) the output of the laser 70.

A further electrical embodiment 60 of the redirecting means includes n arrays of m detectors, one array of m detectors for each of the n possible columns that each one of the incident beams can be directed to, where each detector can be selectively energized (activated). In one embodiment, since the p*m control signals 19 independently route each one of the input signals from the first opto-electronic assembly 16 to a respectively selected column in the central plane 23, one detector from the n arrays of m detectors can be selectively activated. Thus, only the one detector, corresponding to the location to which the beam is routed, is activated. The crosstalk signals in the non selected paths, which are incident on the other non activated detectors, are blocked. This embodiment enables another form of crosstalk suppression in which the detector corresponding to the selected column is activated.

In a further embodiment of this invention, the system 10 or 40 is capable of receiving input beams 12, 14 where the m input optical beams 12, 14 include beams of at least two different center wavelengths. The modules 17 of the first opto-electronic assembly 16, in this embodiment, are capable of emitting beams of substantially a single center wavelength and/or substantially a single polarization. In this embodiment, the modules 28 of the second opto-electronic assembly 10 are capable of emitting beams that include beams of at least two different center wavelengths. During operation, in this embodiment, the modules 17 of the first opto-electronic assembly 16 receive input beams 12, 14 where the m input optical beams 12, 14 include beams of at least two different center wavelengths. The modules 17 of the first opto-electronic assembly 16 emit beams of substantially a single center wavelength and polarization. The router assembly 18 and the redirecting means 24 operate at substantially a single center wavelength. Finally, during operation, in this embodiment, the modules 28 of the second opto-electronic assembly 30 receive the routed, redirected substantially single wavelength beams from redirecting means 24 and emit beams that include beams of at least two different center wavelengths.

Figure 2A:
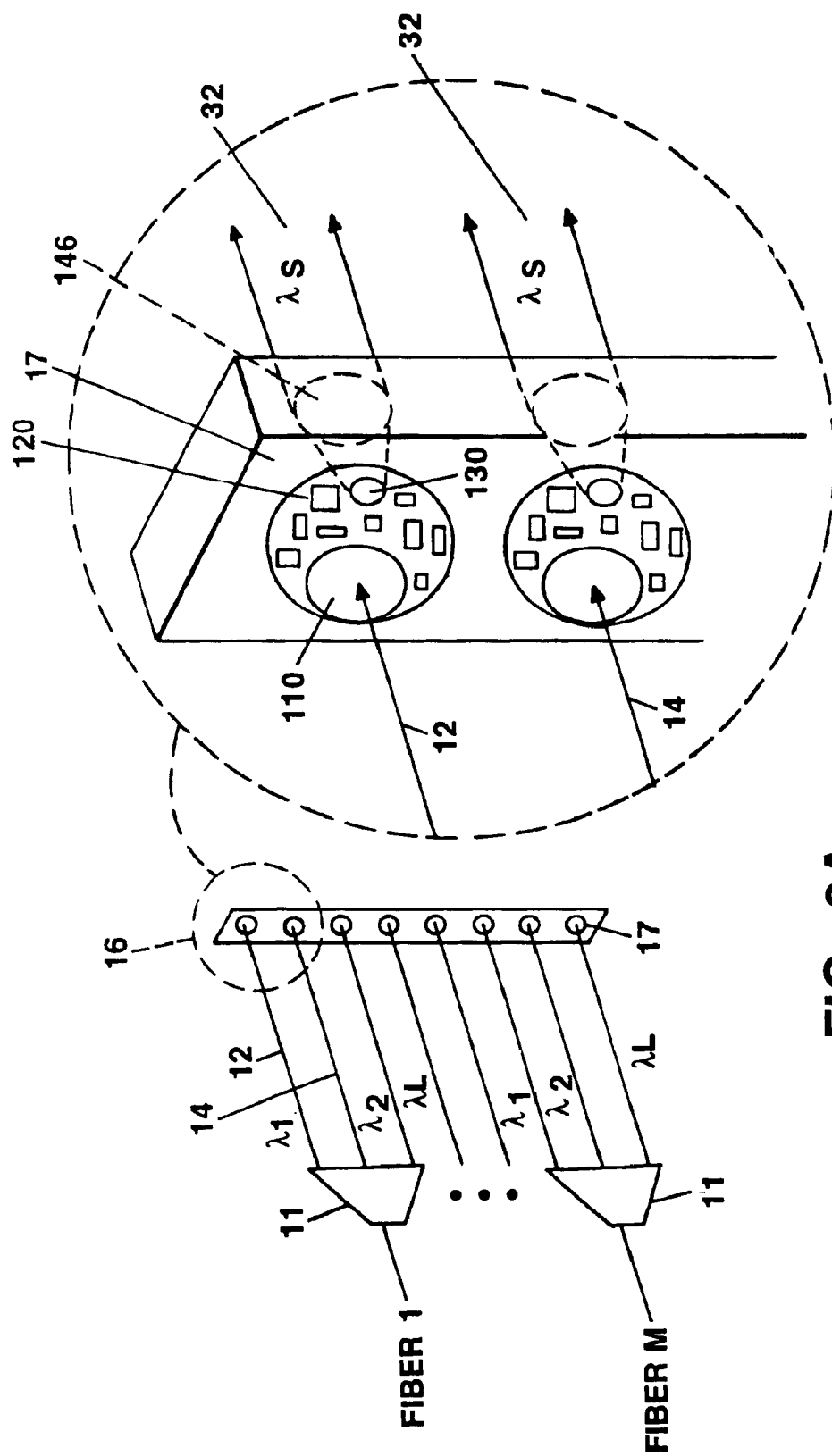
FIG. 2a is a pictorial representation of one module in the first opto-electronic assembly.
Figure 2B:
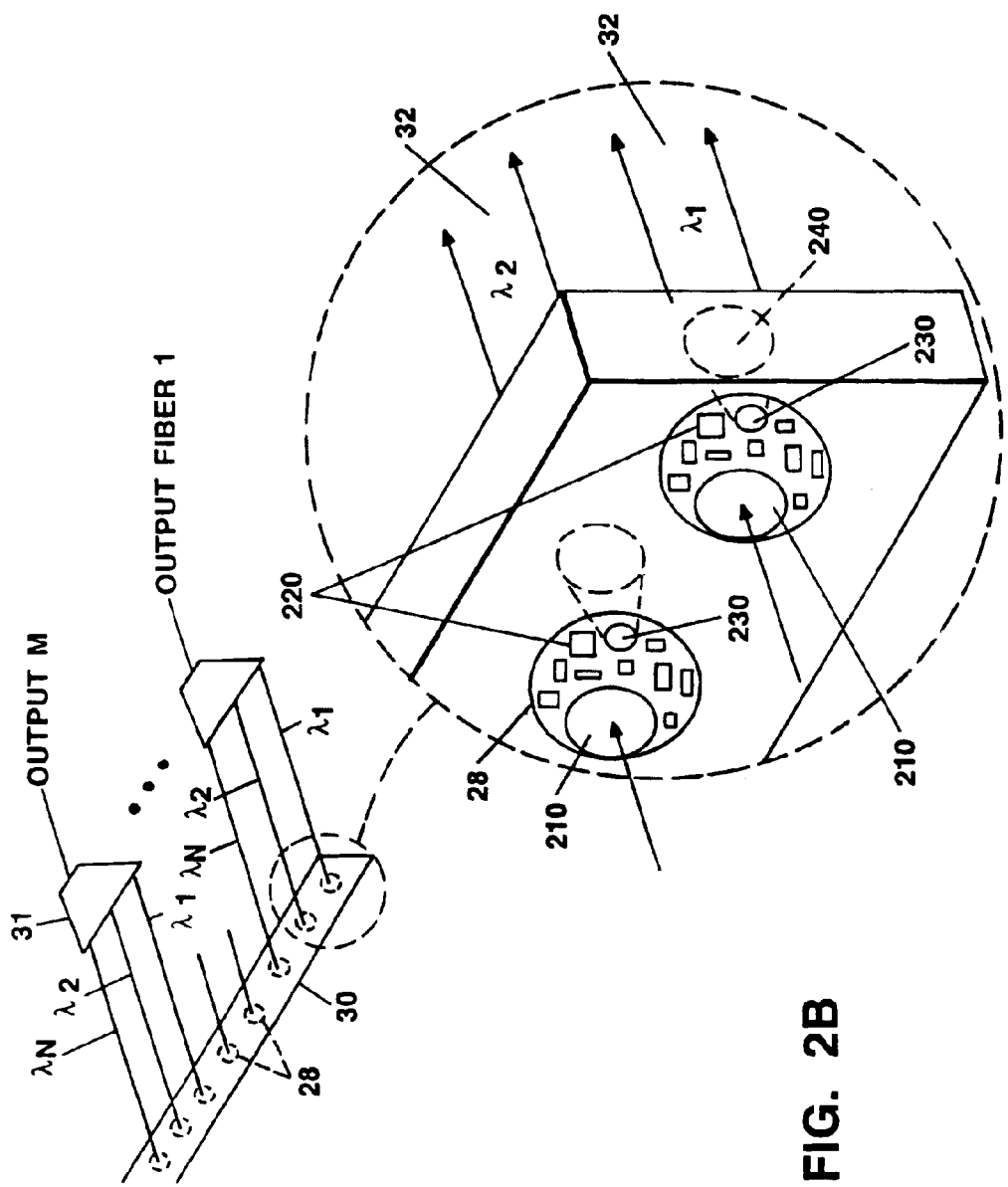
FIG. 2b is a pictorial representation of one module in the second opto-electronic assembly.

For example, when applied in telecommunications, the m input optical beams 12, 14 originated from k optical fibers, each of which carries l WDM or DWDM channels, where m is equal to k times l. These m input channels have been previously separated by conventional demultiplexing means 11 (FIG. 2a). The modules 17 of the first opto-electronic assembly 16 receive input beams 12, 14 where the m input optical beams 12, 14 include beams of at least 1 different center wavelengths and emit m beams of substantially a single center wavelength and polarization into the router assembly 18. This embodiment results in a greatly simplified optical switching task since the router assembly 18 and the redirecting means 24 only have to operate at substantially a single center wavelength and/or substantially a single polarization. The modules 28 of the second opto-electronic assembly 30 receive the routed, redirected substantially single wavelength beams from redirecting means 24 and emit beams at j different wavelengths corresponding to j WDM channels. The beams emitted from modules 28 of the second opto-electronic assembly 30 are multiplexed into a number of output optical fibers (not shown) using conventional multiplexing means 31 (FIG. 2b). If each output channel (beam) is mapped into a specific wavelength on a specific output fiber, this embodiment of the system of this invention can perform arbitrary routing from any wavelength on any input fiber to any wavelength on any output fiber.

The embodiments of the router assembly 18 described herein utilize volume phase diffraction gratings that permit switching of the incident energy between two or more orders. The primary mechanisms considered which permit this diffracted-order switching are electrical switching, optical switching, and polarization switching. However, it should be noted that other embodiments are possible. For example, switched reflective gratings or switchable mirrors can also be used to form router assembly 18.

Other embodiments of router assembly 18 include, but are not limited to, Micro-ElectroMechanical Systems (MEMS) and two dimensional assemblies such as liquid crystal arrays and thermo-optic (bubble) devices.

It should also be noted that, while FIG. 1 depicts m input beams 12, 14 being switched by system 10 to an equal number of output beams 30, it is possible to have an unequal number of input and output beams.

It should be further noted that, although the optical switching and routing system 10 has been described in terms of a two state, "on" and "off", router assembly 18, intermediate states are possible allowing the input beam to be split into two or more output beams. For example, in many switched grating techniques (such as some using nematic liquid crystals or polymer dispersed liquid crystals, PDLC, in gratings) the grating efficiency can be set at intermediate values, rather than completely off or on as described above. Thus, gratings can be electrically set at intermediate efficiency levels and as a result one input beam can be steered and nearly losslessly split to two or more output beams.

It should be also noted that photodetector 120, 220 may include processing electronics for signal processing or conditioning. (Both signal processing and conditioning modify the electrical signal. Amplification and filtering can be considered embodiments of conditioning.). The presence of processing electronics gives rise to applications not possible with the purely optical switch and which may have properties not encountered in the purely opto-electronic switch.

It should be noted that micro-optical or optical elements may be used to focus the channels onto the noise suppressor, to optically modified the optical beams arriving at the detector in the input 16 or the output 30 opto-electronic assembly, or to optically modify the beams being emitted from the input 16 or the output 30 opto-electronic assembly.

Although the invention has been described with respect to various embodiments, it should be realized this invention is also capable of a wide variety of further and other embodiments within the spirit and scope of the appended claims.

What is claimed is:

1. An optical switching/routing system comprising:
   a first opto-electronic assembly, a router assembly, a second opto-electronic assembly and a redirecting subsystem optically interposed between said router assembly and said second opto-electronic assembly;

said first opto-electronic assembly being capable of receiving a first plurality of individual beams of electromagnetic radiation, and of emitting a second plurality of individual beams of electromagnetic radiation;

said router assembly being capable of receiving said second plurality of individual beams of electromagnetic radiation, and of directing each of said individual beams from said second plurality of individual beams respectively to a preselected location on said redirecting sub-system;

said redirecting sub-system being capable of receiving each of said individual beams from said second plurality of individual beams and providing a plurality of redirected outputs to said second opto-electronic assembly; and, said second opto-electronic assembly being capable of receiving said plurality of redirected outputs and of emitting a third plurality of individual beams of electromagnetic radiation.

2. The system of claim 1 wherein said first opto-electronic assembly comprises at least one module having a detector, and a laser.

3. The system of claim 2 wherein said laser is a vertical cavity surface emitting laser.

4. The system of claim 2 wherein said first opto-electronic assembly further comprises an amplifier.

5. The system of claim 2 wherein said first opto-electronic assembly further comprises circuits capable of modifying an electrical output of said detector.

6. The system of claim 1 wherein said first plurality of individual beams of electromagnetic radiation includes beams of at least two different center wavelengths and each beam of said second plurality of individual beams has substantially a same center wavelength and substantially a same polarization.

7. The system of claim 6 wherein said third plurality of individual beams of electromagnetic radiation includes beams of at least two different center wavelengths.

8. The system of claim 1 wherein said first router assembly comprises at least one element selected from the group consisting of a switchable diffractive element, a switchable diffractive grating, a switchable liquid crystal element, and a switchable mirror.

9. The system of claim 6 wherein said first router assembly comprises at least one switchable diffractive element; and, wherein said at least one diffractive element is a volume holographic element.

10. The system of claim 1 further comprising cross-talk suppression means optically associated with said router assembly and said redirecting means.

11. The system of claim 1 wherein said redirecting sub-system comprises an optical component.

12. The system of claim 11 wherein said optical component includes at least one microlens.

13. The system of claim 11 wherein said optical component includes at least one pixellated grating.

14. The system of claim 1 wherein said redirecting means comprise an electrical redirecting means.

15. The system of claim 14 wherein said electrical redirecting means comprise at least one stripe radiation detector.

16. The system of claim 14 wherein said electrical redirecting means comprise at least one array of radiation detectors.

17. The system of claim 16 wherein at least one detector from the at least one array of radiation detectors is capable of being selectively activated.

18. The system of claim 1 wherein said second opto-electronic assembly comprises at least one module having a detector and a laser.

19. The system of claim 18 wherein said second opto-electronic assembly further comprises circuits capable of modifying an electrical output of the detector.

20. A method for switching/routing optical beams comprising the steps of:

receiving a first plurality of individual beams of electromagnetic radiation at a first opto-electronic assembly;

emitting a second plurality of individual beams of electromagnetic radiation from said first opto-electronic assembly;

receiving said second plurality of individual beams of electromagnetic radiation at a switching/routing assembly;

switching/routing each beam from said second plurality of individual beams to a preselected location;

redirecting said second plurality of individual beams, after switching/routing each beam from said second plurality of individual beams to the preselected location, to a second opto-electronic assembly;

receiving said second plurality of individual beams of electromagnetic radiation at said second opto-electronic assembly;

emitting, from said second opto-electronic assembly, a third plurality of individual beams of electromagnetic radiation.

21. The method of claim 20 further comprising the step of: reducing noise in the switching/routing and redirection of said second plurality of individual beams.

22. A method for switching and routing optical beams comprising the steps of:

receiving a first plurality of individual beams of electromagnetic radiation at a first opto-electronic assembly wherein said first plurality of individual beams of electromagnetic radiation includes beams of at least two different center wavelengths;

emitting a second plurality of individual beams of electromagnetic radiation from said first opto-electronic assembly wherein each beam of said second plurality of individual beams has substantially a same characteristic, said same characteristic being selected from a group consisting of center wavelength, polarization, and center wavelength and polarization;

receiving said second plurality of individual beams of electromagnetic radiation at a router assembly;

routing each beam from said second plurality of individual beams to a preselected location;

redirecting said second plurality of individual beams, after routing each beam from said second plurality of individual beams to the preselected location, to a second opto-electronic assembly;

receiving said second plurality of individual beams of electromagnetic radiation at said second opto-electronic assembly;

emitting, from said second opto-electronic assembly, a third plurality of individual beams of electromagnetic radiation.

23. The method of claim 22 wherein said third plurality of individual beams of electromagnetic radiation including beams of at least two different center wavelengths.

24. The method of claim 22 further comprising the step of: reducing noise in the routing and redirection of said second plurality of individual beams.

25. The method of claim 20 wherein said second plurality of individual beams of electromagnetic radiation has substantially a same polarization.

* * * * *